(12) United States Patent
Okamori et al.

(10) Patent No.: US 6,437,909 B1
(45) Date of Patent: Aug. 20, 2002

(54) UV-ABSORBING FILTER AND OPTICAL APPARATUS INCORPORATING THE SAME

(75) Inventors: Shinji Okamori; Akihisa Miyata; Shosuke Oka; Naoki Kawamoto, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/878,965

(22) Filed: Jun. 13, 2001

(30) Foreign Application Priority Data

Dec. 6, 2000 (JP) .......................................... 2000-371049

(51) Int. Cl.[7] .................................................. F21V 9/06
(52) U.S. Cl. ........................ 359/361; 359/362; 359/359; 359/588; 359/589
(58) Field of Search .................................. 359/361, 362, 359/359, 585, 588, 589, 590, 350

(56) References Cited

FOREIGN PATENT DOCUMENTS

JP        2833055         10/1998

*Primary Examiner*—Mohammad Sikder

(57) ABSTRACT

A UV-absorbing filter absorbs a UV component of incoming light to reduce an amount of the UV component of transmitted light. The UV-absorbing filter comprises a transparent UV-absorbing glass plate which contains a UV-absorbing substance; a transparent first and second heat-resistant glass plates which face respective surfaces of the UV-absorbing glass plate; a first and second distance pieces which are made of heat-resistant resin and which are respectively interposed between the UV-absorbing glass plate and the first and second heat-resistant glass plates, in the vicinity of an outer edge of the UV-absorbing glass plate, so as to form a space between them.

14 Claims, 4 Drawing Sheets

UV-ABSORBING FILTER AND OPTICAL APPARATUS INCORPORATING THE SAME

BACKGROUND OF THE INVENTION

The present invention relates to an ultraviolet-absorbing (UV-absorbing) filter which absorbs an ultraviolet component (UV component) of incoming light to reduce the amount of the UV component of transmitted light and an optical apparatus, such as a light source system, an illuminating optical system, and a projection display apparatus, incorporating the same.

Generally, a projection display apparatus (projector) projects an image displayed on a light valve onto a screen by directing light emitted from a discharge lamp onto the light valve. From the discharge lamp, however, the ultraviolet light (UV light) which degrades the light valve is emitted together with the visible light. The Japanese Patent Publication No. 2,833,055 proposes a method of reducing the amount of an output UV component by coating the cover glass of the reflector in the light source system with multiple layers of a dielectric material that reflect the UV light.

The multiple coats of the dielectric material, however, reflect not only the UV light but also a certain amount of visible light and infrared light (IR light), and the return light causes the tube temperature of the discharge lamp to increase, thereby promoting devitrification of the silica glass forming the tube and consequently reducing the life of the lamp.

A UV-absorbing glass plate might be used to reduce the return light, thereby decreasing the amount of a UV component of the transmitted light. However, because the discharge lamp, such as a xenon lamp, a metal halide lamp, and a mercury lamp, used as a light source of a projector emits a great amount of UV light, the heat generation associated with the absorption of the UV light can crack (or can melt or burn) the UV-absorbing glass plate, therefore it has been difficult to use the UV-absorbing glass plate in the projector.

It is an object of the present invention to provide a UV-absorbing filter which can reduce the amount of UV component of transmitted light by absorbing the UV component of incoming light, has a high heat dissipation property, and offers a UV-absorbing filter.

According to one aspect of the present invention, a UV-absorbing filter which absorbs a UV component of incoming light to reduce an amount of the UV component of transmitted light, comprising a transparent UV-absorbing glass plate which has a first surface and a second surface and which contains a UV-absorbing substance; a transparent first heat-resistant glass plate which faces the first surface; a transparent second heat-resistant glass plate which faces the second surface; a first distance piece which is made of heat-resistant resin and which is interposed between the first surface and the first heat-resistant glass plate, in the vicinity of an outer edge of the UV-absorbing glass plate, so as to form a first space between the first surface and the first heat-resistant glass plate; and a second distance piece which is made of heat-resistant resin and which is interposed between the second surface and the second heat-resistant glass plate, in the vicinity of the outer edge of the UV-absorbing glass plate, so as to form a second space between the second surface and the second heat-resistant glass plate.

A major constituent of the UV-absorbing glass plate may be potash-lime glass. Further, the UV-absorbing substance contained in the UV-absorbing glass plate may be cerium. Furthermore, the first heat-resistant glass plate and the second heat-resistant glass plate may be made of borosilicate glass. Moreover, the first distance piece and the second distance piece may be made of polyimide. In addition, thicknesses of the first distance piece and the second distance piece may be within a range of 100 μm to 150 μm. Further, the outer edge of the UV-absorbing glass plate, outer edges of the first and second distance pieces, and outer edges of the first and second heat-resistant glass plates may be kept in alignment with one another. Furthermore, the first space is hermetically sealed by the UV-absorbing glass plate, the first heat-resistant glass plate, and the first distance piece; and the second space is hermetically sealed by the UV-absorbing glass plate, the second heat-resistant glass plate, and the second distance piece.

According to another aspect of the present invention, an optical apparatus comprises a lamp; a reflector which reflects light emitted from the lamp; and a UV-absorbing filter disposed on an optical path of the light emitted from the lamp and reflected by the reflector. The UV-absorbing filter includes a transparent UV-absorbing glass plate which has a first surface and a second surface and which contains a UV-absorbing substance; a transparent first heat-resistant glass plate which faces the first surface; a transparent second heat-resistant glass plate which faces the second surface; a first distance piece which is made of heat-resistant resin and which is interposed between the first surface and the first heat-resistant glass plate, in the vicinity of an outer edge of the UV-absorbing glass plate, so as to form a first space between the first surface and the first heat-resistant glass plate; and a second distance piece which is made of heat-resistant resin and which is interposed between the second surface and the second heat-resistant glass plate, in the vicinity of an outer edge of the UV-absorbing glass plate, so as to form a second space between the second surface and the second heat-resistant glass plate.

A reflecting surface of the reflector may have the form of a paraboloid of revolution; and the lamp may be disposed in such a manner that a center of light emission of the lamp is placed in the vicinity of a focal point of the reflector. Further, the optical apparatus may satisfy $1.1\ fp < D/d < 2.1\ fp$ where a symbol D denotes an opening diameter of the reflector and a symbol d denotes a diameter of the UV-absorbing filter. Furthermore, the optical apparatus may further comprise a condenser lens system which converges the light which has passed the UV-absorbing filter; and a body tube which holds the UV-absorbing filter and the condenser lens system. Moreover, the optical apparatus may further comprise a condenser lens system which converges the light which has passed the UV-absorbing filter, wherein the optical apparatus satisfies $5.1\ fp < fc < 9.6\ fp$ where a symbol fp denotes a focal length of the reflector and a symbol fc denotes a composite focal length of the condenser lens system. In addition, the optical apparatus may further comprise: an optical pillar element; a light valve; a light transmitting optical system which provides a substantially conjugate relationship between an end of radiation of the optical pillar element and the light valve, the light transmitting optical system directing the light which is converged by the condenser lens system and passes the optical pillar element onto the light valve; and a projection lens system which projects light which has been modulated by the light valve onto a screen.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred Embodiments of the invention, are given by way of illustration only, since various changes and modifications will become apparent to those skilled in the art from the detailed description.

First Embodiment

Figure 1:
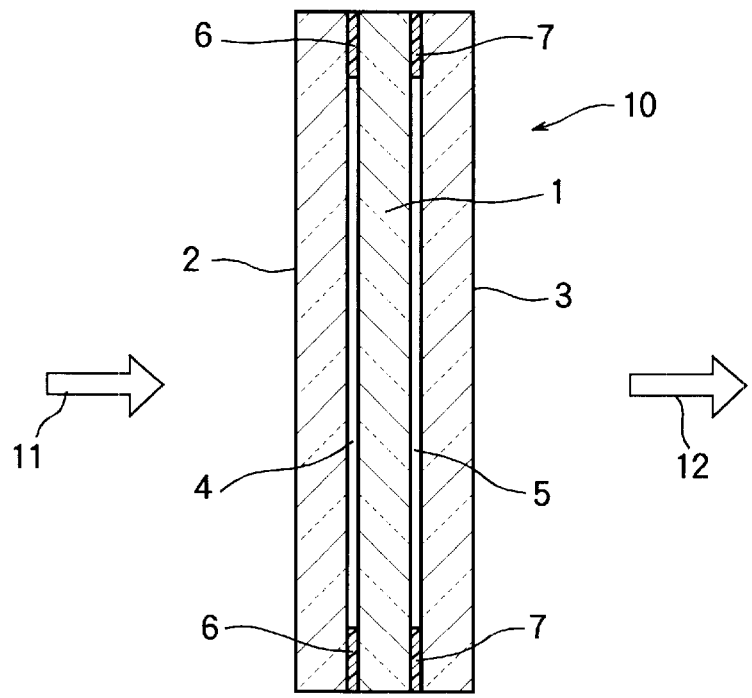
FIG. 1 is a cross-sectional view schematically showing a configuration of a UV-absorbing filter according to the first embodiment of the present invention.

FIG. 1 is a cross-sectional view schematically showing a configuration of a UV-absorbing filter 10 according to the first embodiment of the present invention. As shown in FIG. 1, the UV-absorbing filter 10 according to the first embodiment comprises a transparent UV-absorbing glass plate 1 which contains a UV-absorbing substance, transparent heat-resistant glass plates 2 and 3 which are respectively disposed to face both surfaces of the UV-absorbing glass plate 1, and distance pieces 6 and 7 which are made of heat-resistant resin and which are respectively interposed between the surface of the UV-absorbing glass plate 1 and the inner surface of the heat-resistant glass plates 2 and 3, in the vicinity of the outer edge of the UV-absorbing glass plate 1. The UV-absorbing glass plate 1, the heat-resistant glass plates 2 and 3, and the distance pieces 6 and 7 form spaces 4 and 5 between them.

A major constituent of the UV-absorbing glass plate 1 is potash-lime glass, for example. However, it is not limited to potash-lime glass. The UV-absorbing substance contained in the UV-absorbing glass plate 1 is Ce (cerium), for instance. When Ce absorbs UV light, the absorbed UV light are converted into phosphorescence or thermal energy. With this type of UV-absorbing glass plate 1, UV light having wavelengths of up to 380 nm can be absorbed, and the amount of the UV component contained in the transmitted light can be reduced. The UV-absorbing glass plate 1 is made of transparent and colorless material, which could be slightly bluish, depending on the base glass, and shows very good transmission properties for visible light. The material of the UV-absorbing glass plate 1 may not be Ce-containing glass if it has a high transmission for visible light. Further, as the thickness of the UV-absorbing glass plate 1 increases, the cut-off wavelength tends to shift toward the long wavelength side, so that a smaller plate thickness is preferable.

The heat-resistant glass plates 2 and 3 are made of borosilicate glass, for instance. However, they are not limited to borosilicate glass. Borosilicate glass has a small linear expansion coefficient, high resistance to heat, and high thermal conductivity. As the heat-resistant glass plates 2 and 3, Pyrex (trademark) of Corning Incorporated (U.S.A.) and TEMPAX (trademark) of Schott Corporation (Germany) are preferable.

The heat-resistant resin forming the distance pieces 6 and 7 are polyimide, for instance. However, it is not limited to polyimide. If the thicknesses of the distance pieces 6 and 7 are within the range of 100 µm to 150 µm, the distance pieces 6 and 7 are kept-to right hardness, facilitating the assembly task. However, the thicknesses of the distance pieces 6 and 7 are not limited to the range indicated above.

In the first embodiment, the UV-absorbing glass plate 1 and the heat-resistant glass plates 2 and 3 are circular. However, these shapes are not necessarily circular. In the first embodiment, the distance pieces 6 and 7 are annular. However, these shapes are not necessarily annular. In the first embodiment, the outer edge of the UV-absorbing glass plate 1, the outer edges of the distance pieces 6 and 7, and the outer edges of the heat-resistant glass plates 2 and 3 are kept in alignment with one another. However, these are not necessarily kept in alignment with one another. Further, in the first embodiment, the spaces 4 and 5 formed between the UV-absorbing glass plate 1 and the heat-resistant glass plates 2 and 3 are hermetically sealed by the UV-absorbing glass plate 1, the heat-resistant glass plates 2 and 3, and the distance pieces 6 and 7. However, the spaces 4 and 5 may also be connected to the outside air.

If light (an arrow 11 in FIG. 1) from the discharge lamp (not shown in FIG. 1) enters the UV-absorbing filter 10 of the first embodiment, configured as described above, for instance, the incoming light passes the heat-resistant glass plate 2, travels across the space 4, and enters the UV-absorbing glass plate 1. In the UV-absorbing glass plate 1, UV component contained in the incoming light are absorbed, and the light with a reduced UV component, which has passed the UV-absorbing glass plate 1, travels across the space 5, passes the heat-resistant glass plate 3, and comes out (an arrow 12 in FIG. 1).

With the UV-absorbing filter 10 according to the first embodiment, the UV-absorbing glass plate 1 can effectively dissipate radiant heat because the UV-absorbing glass plate 1 is disposed between the heat-resistant glass plates 2 and 3 made of borosilicate glass with a high thermal conductivity. Accordingly, even if intense light enters the UV-absorbing filter 10, the temperature increase in the UV-absorbing glass plate 1 can be suppressed, and the generation of thermal stress can be suppressed by relieving the temperature gradient in the surface, so that the danger of fracture in the UV-absorbing glass plate 1 can be reduced.

In addition, because the UV-absorbing glass plate 1 is disposed between the heat-resistant glass plates 2 and 3, in the event of fracture in the UV-absorbing glass plate 1, the fragments remain in the spaces 4 and 5 and will not be scattered outside the UV-absorbing filter 10. Accordingly, the user or the service technician can replace the UV-absorbing filter 10 with safety. If the UV-absorbing glass plate 1 should be fractured, the UV-absorbing capability of the UV-absorbing filter 10 would decrease, but the capability of passing the visible light would be hardly degraded. Therefore, even if the UV-absorbing glass plate 1 is fractured, the UV-absorbing filter 10 can remain in service, and the timing of replacement of the UV-absorbing filter 10 can be selected for the convenience of the user or the service technician.

In the first embodiment, the distance pieces 6 and 7 have annular shapes to cover the outer edge of the UV-absorbing glass plate 1 and prevent the UV-absorbing glass plate 1 from coming into direct contact with the heat-resistant glass plates 2 and 3, so that the rate of heat transfer from the outer edge portion of the UV-absorbing glass plate 1 to the outer edge portions of the heat-resistant glass plates 2 and 3 is low. Accordingly, a sudden decrease in temperature of the outer edge portion of the UV-absorbing glass plate 1, which could result in an extremely uneven distribution of stress in the UV-absorbing glass plate 1, will not occur, and the danger of fracture in the UV-absorbing glass plate 1 caused by an uneven stress distribution can be reduced. Especially, in the outer edge portion of the UV-absorbing glass plate 1, there is great danger that a minute crack formed by grinding or the like develops into fracture, so that unevenness in stress distribution has to be minimized. Therefore, the configuration of the first embodiment is highly effective for decreasing the danger of fracture in the UV-absorbing glass plate 1.

Moreover, in the first embodiment, because the spaces 4 and 5 are provided, the UV-absorbing glass plate 1 does not come into direct contact with the heat-resistant glass plates 2 and 3, which decreases the possibility of having a thermal effect or mechanical impact on each other and consequently decreases the danger of fracture in the UV-absorbing glass plate 1. Because the spaces 4 and 5 are hermetic spaces, the possibility L- of damaging the UV-absorbing glass plate 1 by dust entering the spaces 4 and 5 is eliminated.

Second Embodiment

Figure 2:
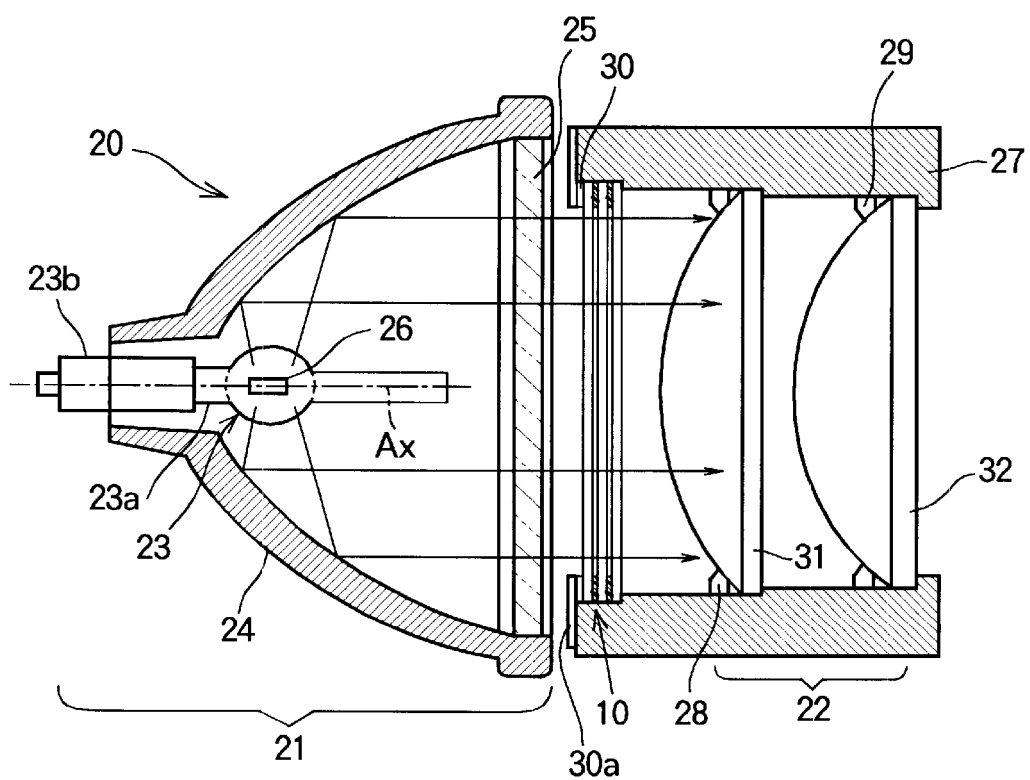
FIG. 2 is a cross-sectional view schematically showing a configuration of an optical apparatus (an illuminating optical system) according to the second embodiment of the present invention.

FIG. 2 is a cross-sectional view schematically showing a configuration of an optical apparatus according to the second embodiment of the present invention. The optical apparatus shown in FIG. 2 is, for instance, an illuminating optical system 20 that directs light onto a light valve of a projector. As shown in FIG. 2, the illuminating optical system 20 according to the second embodiment comprises a light source unit 21, the UV-absorbing filter 10 of FIG. 1, and a condenser lens system 22.

The light source unit 21 comprises a lamp 23, a reflector 24 that reflects the light emitted from the lamp 23, and a cover glass 25 that is disposed in the opening of the reflector 24. The lamp 23 is a short-arc metal halide lamp, for instance. The arc tube 23a of the lamp 23 has a substantially spherical portion at its center, with cylindrical branches disposed on both sides. The lamp 23 is provided with a base electrode 23b. However, the type and shape of the lamp 23 maybe different from those described above.

In the second embodiment, a reflecting surface of the reflector 24 has the form of a paraboloid of revolution, for instance. However, the shape of the reflecting surface of the reflector 24 is not necessarily a paraboloid of revolution. In the first embodiment, the lamp 23 is disposed in such a manner that a center of light emission of the lamp 23 is placed in the vicinity of a focal point of the reflector 24. As a result, the light emitted from the lamp 23 is reflected by the inner surface of the reflector 24 and then becomes substantially parallel to an optical axis AX of the reflector 24. In addition, the reflector 24 is formed by coating the inner surface of a heat-resistant member made of borosilicate glass, ceramics, or the like with a reflective layer. The reflective layer can be a thin layer that reflects a visible light and passes UV light and IR light. The cover glass 25 is made of heat-resistant glass such as borosilicate glass and is secured to the opening of the reflector 24 with an adhesive or the like. The reflector 24 and the cover glass 25 completely confine the lamp 23 inside.

Figure 3:
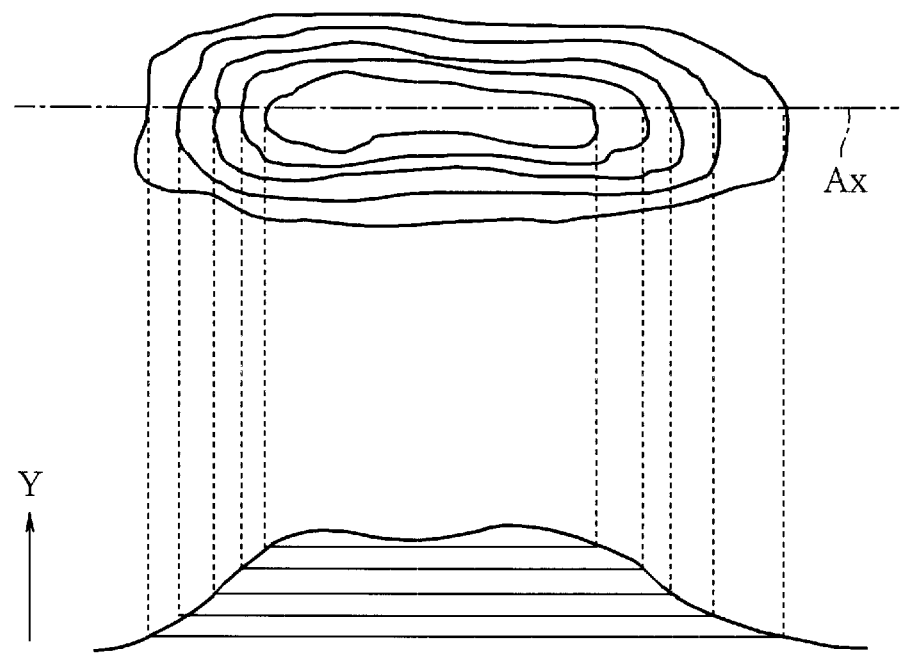
FIG. 3 illustrates an intensity distribution of light emitted from an illuminant of a lamp in the optical apparatus according to the second embodiment.
Figure 4:
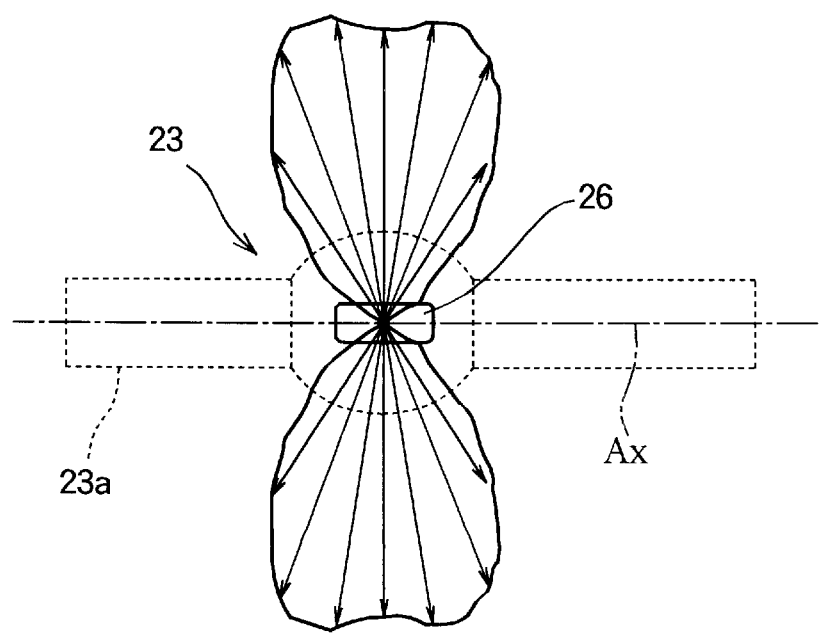
FIG. 4 shows a light distribution of the lamp in the optical apparatus according to the second embodiment.

FIG. 3 illustrates an intensity distribution of light emitted from an illuminant 26 disposed in an arc tube 23a of the lamp 23. The upper part of FIG. 3 shows contour lines of the intensity distribution. The lower part of FIG. 3 shows that the intensity of the emitted light (vertical axis Y) is high inside and low outside. This type of intensity distribution varies with the shape of the arc tube 23a of the lamp 23. In addition, FIG. 4 illustrates a distribution of light emitted from the illuminant 26 of the lamp 23. As shown in FIG. 4, the intensity in the direction along the optical axis AX is almost 0. This is because the intensity is weakened not only by the refraction of light in the spherical portion in the center of the arc tube 23a but also by an eclipse of light by the lamp 23 itself in the optical axis AX.

Figure 5:
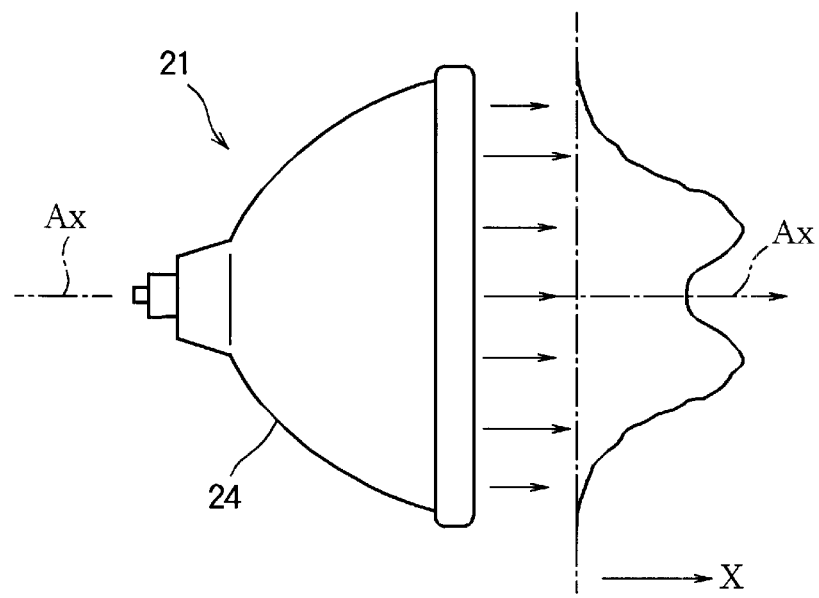
FIG. 5 shows an intensity distribution of light emitted from a light source system of the optical apparatus according to the second embodiment.

The opening diameter of the reflector 24 is determined by the light distribution and position of the illuminant 26 of the lamp 23. According to computer simulation or experiment, the reflector 24 requires an opening diameter of around 75 mm to 90 mm if the lamp 23 has a distance of about 1 mm between electrodes and if the reflector 24 has a reflecting surface having the form of a paraboloid with a focal length of 7 mm to 8.5 mm. However, the effective diameter of the substantially parallel light reflected by the reflector 24 maybe smaller, and when it is around 45 mm to 65 mm, a desired quantity of light can be obtained. This is because the substantially parallel light has a doughnut-shaped intensity distribution in which the intensity is low in the vicinity of the optical axis AX, reaches the peak of intensity in the middle, and decreases toward the outer edge portion, as shown in FIG. 5 (in FIG. 5, the X-axis represents intensity). Accordingly, in most cases, no substantial problem would occur even if the diameter of the UV-absorbing filter 10 is smaller than the opening diameter of the reflector 24.

Through the consideration described above, it is desired that the following expression (1) be satisfied:

$$1.1 < D/d < 2.1 \quad (1)$$

where the opening diameter of the reflector 24 is represented as D and the effective diameter of the UV-absorbing filter 10 is represented as d. The reason is as follows. If the range is smaller than the lower limit of the expression (1), the diameter of the UV-absorbing filter 10 becomes too large and is cost-wasting. If the range of the upper limit of the expression (1) is exceeded, the diameter of the UV-absorbing filter 10 becomes too small, decreasing the efficiency of light utilization.

The condenser lens system 22 that converges light which has passed the UV-absorbing filter 10 comprises condenser lenses 31 and 32, which are two positive lenses. The substantially parallel light emitted from the light source unit 21 passes the UV-absorbing filter 10, and then is converged by the condenser lens system 22 and forms a minute optical spot (hereafter referred to as a focused spot) having a certain size in a certain position.

In the first embodiment, the reflector 24 comprising the light source unit 21 has a focal length fp of about 7.5 mm and an effective opening diameter D of about 78 mm, the condenser lens system 22 has a composite focal length fc of about 50 mm, and these two are disposed at established intervals. In this setting, a focused spot having an effective diameter of about 9 mm can be formed.

By selecting specifications of the light source unit 21 and the condenser lens system 22, the effective diameter of the focused spot can be changed as desired. As the ratio of the composite focal length fc of the condenser lens system 22 to the focal length fp of the reflector 24 relatively decreases, the spot diameter decreases, which however increases the light of outer region that cannot be converged by the condenser lens system 22 and degrades the efficiency of light utilization. On the other hand, as the relative ratio increases, the quantity of light converged by the condenser lens system 22 increases, increasing the diameter of the focused spot and consequently degrading the efficiency of light utilization. Depending on the purpose of the illuminating optical system, the optimum range as the illuminating optical system can be determined by the size of the illuminant 26 of the lamp 23, through consideration of the characteristic intensity distribution of the substantially parallel light.

First, suppose that the illuminating optical system 20 comprises the reflector 24 having such an opening diameter that almost all radiated light can be collected according to the characteristic light distribution of the illuminant and the light source unit 21 comprising the discharge lamp 23 with a distance of about 1 mm between electrodes. If the parabolic reflector 24 having a focal length of 7 mm to 8.5 mm is specifically considered, the computer simulation or experiment indicates that a high efficiency of light utilization can be implemented and a wide range of specifications can be supported, by setting the composite focal length of the condenser lens system 22 to around 45 mm to 65 mm.

In summary of the consideration described above, an illuminating optical system is appropriate if the focal length fp of the reflector 24 and the composite focal length fc of the condenser lens system 22 satisfy the relationship represented by the following expression (2):

$$5.1\ fp < fc < 9.6\ fp \quad (2)$$

The reason is as follows. If the range is smaller than the lower limit of expression (2), the loss of light that cannot be collected by the condenser lens system 22 increases. On the other hand, if the upper limit of the expression (2) is exceeded, the distance between the lamp 23 and the reflector 24 is too short to ensure thermal stability, or the diameter of the focused spot formed by the condenser lens system 22 increases, decreasing the efficiency of light utilization.

With the illuminating optical system 20 configured as described above, by disposing the UV-absorbing filter 10 in the substantially parallel luminous flux with a low energy density from the light source unit 21, UV light can be effectively eliminated. Accordingly, a temperature rise around the focused spot formed by the condenser lens system 22 can be minimized, so that heavy use of expensive heat-resistant members can be avoided.

Next, the structure for holding the UV-absorbing filter 10 will be described. As shown in FIG. 2, the UV-absorbing filter 10 and the condenser lenses 31 and 32 are held in the body tube 27. The condenser lenses 31 and 32 are secured in the stepped portions inside the body tube 27 by the pressure rings 28 and 29. In another stepped portion inside the body tube 27, the UV-absorbing filter 10 is secured by a spacer 30 made of a soft material and the leaf spring 30a that applies a small pressure to the UV-absorbing filter 10.

The UV-absorbing filter 10 must prevent great unevenness from being developed in the temperature distribution in the surface of the UV-absorbing glass plate 1 and must suppress the heat dissipation from the outer edge portion, as described above. For these purposes, it is preferable that the body tube 21 is made of a material having low thermal conductivity such as a plastic. The structure shown in FIG. 2 holds the UV-absorbing filter 10 and the condenser lens system 22 by the common body tube 27, which can be easily implemented because the two components need to have similar diameters, and many effects such as lightweight and low cost can be expected because the condenser portion independent of the light source unit 21 can be compact.

Third Embodiment

Figure 6:
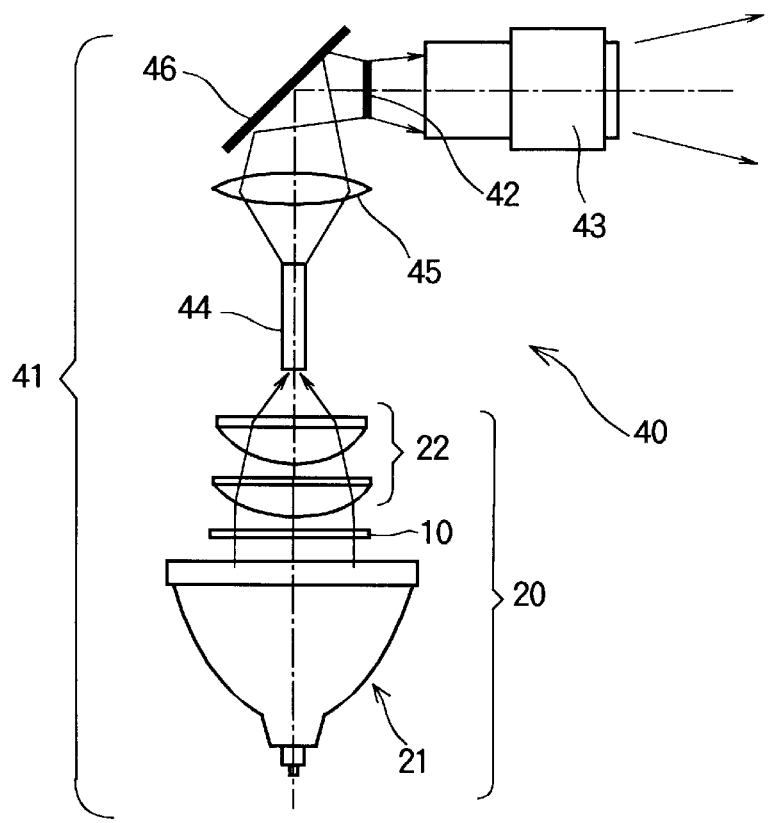
FIG. 6 is a schematic diagram showing a configuration of the optical apparatus (projector) according to the third embodiment of the present invention.

FIG. 6 schematically shows a configuration of an optical apparatus according to the third embodiment of the present invention. The optical apparatus shown in FIG. 6 is a projector 40. As shown in FIG. 6, the projector 40 according to the third embodiment comprises an optical system 41, a light valve 42 such as a liquid crystal panel, and a projection lens system 43. The optical system 41 comprises the illuminating system 20 of FIG. 2, an optical pillar element 44 formed by a cylindrical glass, a square pillar glass or the like, a relay lens system 45, and a reflecting mirror 46.

In the projector 40 according to the third embodiment, the components are disposed in such a manner that the position of the focused spot formed by the convergent light emitted from the condenser lens system 22 (arrows in FIG. 6 represent paths of light beams) substantially coincides with an incident end of the optical pillar element 44. The optical pillar element 44 has property of mixing the intensity distribution of light space-wise, and as a result, an area light source having an even intensity distribution in the radiation end is formed. The optical pillar element 44 is specifically referred to as an integrator rod or light pipe and is heavily used in the conventional projectors.

The relay lens system 45 comprises an imaging optical system that provides a conjugate relationship between the radiation end of the optical pillar element 44 and the light valve 42, by which the light valve 42 is subjected to substantially even illumination. The reflecting mirror 46 is disposed in the optical path in order to bend the optical path in a certain direction, which enables a compact projector to be implemented. The projection lens system 43 transfers the light modulated by the image formed on the light valve 42 and projects an enlarged image onto a screen not shown in the figure.

The light valve 42 is indicated as a transparent component in FIG. 6, but a reflective light valve may also be used. If a highly efficient optical system can be constructed by forming a minute focused spot in the optical path, as described above, the configuration may be different from the configuration shown in FIG. 6, and projectors having different features can be provided by combining a variety of optical elements.

Figure 7:
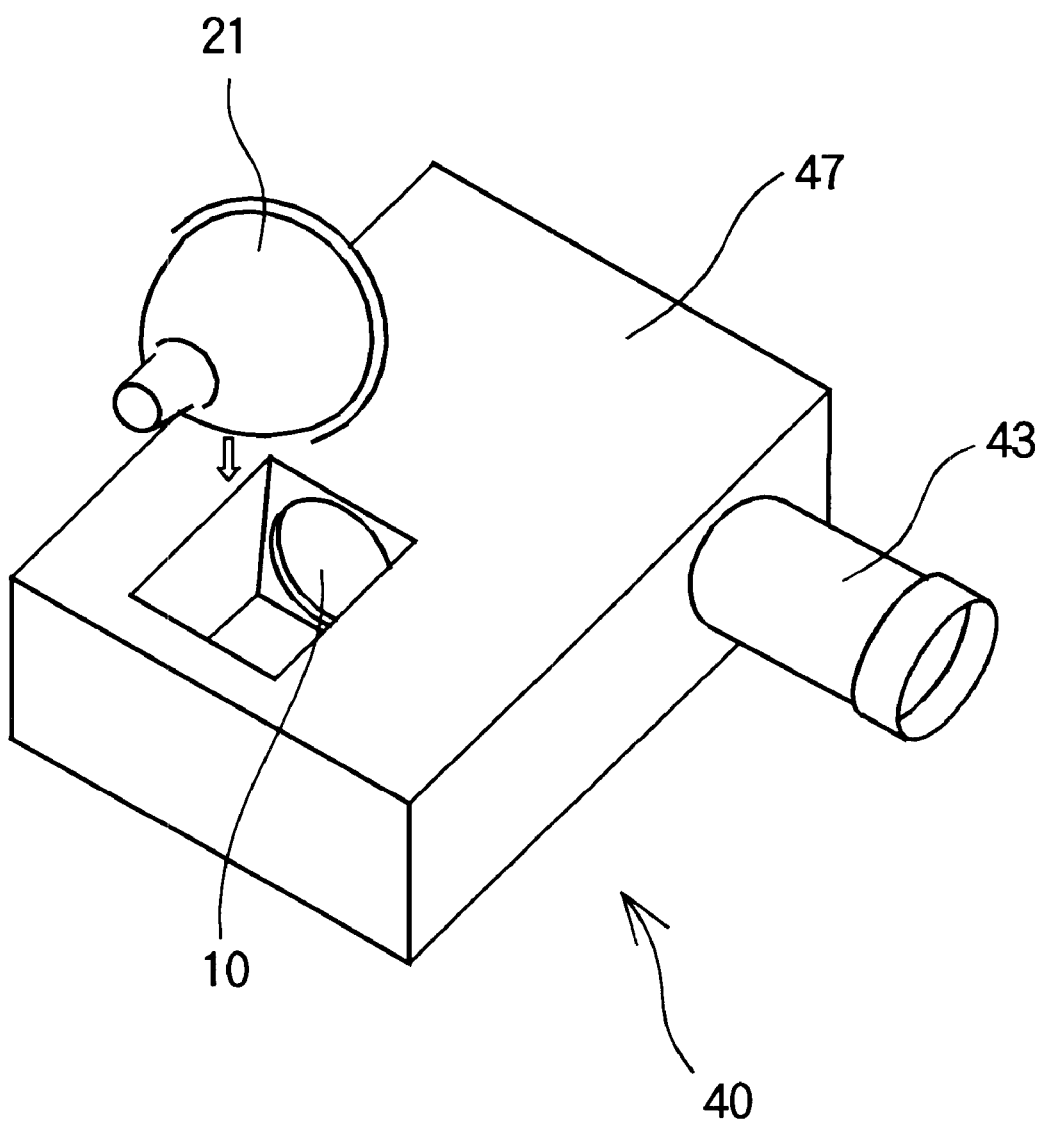
FIG. 7 is a schematic perspective view of the optical apparatus according to the third embodiment.

FIG. 7 is a perspective view of the projector 40 according to the third embodiment. In FIG. 7, a reference numeral 47 denotes a housing (an optical unit base) that encloses a part of the optical system of the projector 40, with the projection lens system 43 disposed as if it is protruding through the side thereof. In addition, a space in which the light source unit 21 can be inserted is created in a part of the housing 47, and the UV-absorbing filter 10 plays a role as an entrance window which allows light to be directed from this space to the optical system disposed in the housing 47. The light source unit 21 can be replaced, and FIG. 7 shows a state in which the light source unit 21 has been detached from the housing 47.

In the projector according to the third embodiment, since the UV-absorbing filter 10 is structured to hold the UV-absorbing glass plate 1 between the heat-resistant glass plates 2 and 3 having a good heat dissipation property, via the distance pieces 6 and 7, it becomes easy to relieve temperature rises in various components disposed in the housing 47, which makes it easy to reduce the cost and weight through the heavy use of resin members with great economies of volume production. Moreover, the UV-absorbing filter 10 can also be efficiently cooled down by a unit shared with the light source unit 21, and if the UV-absorbing glass should be fractured because of an uneven stress distribution due to heat, the fragments will not be scattered outside the housing 47, so that safety in replacing the light source unit 21 can be easily enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A UV-absorbing filter which absorbs a UV component of incoming light to reduce an amount of the UV component of transmitted light, comprising:

a transparent UV-absorbing glass plate which has a first surface and a second surface and which contains a UV-absorbing substance;

a transparent first heat-resistant glass plate which faces said first surface;

a transparent second heat-resistant glass plate which faces said second surface;

a first distance piece which is made of heat-resistant resin and which is interposed between said first surface and said first heat-resistant glass plate, in the vicinity of an outer edge of said UV-absorbing glass plate, so as to form a first space between said first surface and said first heat-resistant glass plate; and a second distance piece which is made of heat-resistant resin and which is interposed between said second surface and said second heat-resistant glass plate, in the vicinity of the outer edge of said UV-absorbing glass plate, so as to form a second space between said second surface and said second heat-resistant glass plate.

2. The UV-absorbing filter according to claim 1, wherein a major constituent of said UV-absorbing glass plate is potash-lime glass.

3. The UV-absorbing filter according to claim 1, wherein said UV-absorbing substance contained in said UV-absorbing glass plate is cerium.

4. The UV-absorbing filter according to claim 1, wherein said first heat-resistant glass plate and said second heat-resistant glass plate are made of borosilicate glass.

5. The UV-absorbing filter according to claim 1, wherein said first distance piece and said second distance piece are made of polyimide.

6. The UV-absorbing filter according to claim 1, wherein thicknesses of said first distance piece and said second distance piece are within a range of 100 $\mu$m to 150 $\mu$m.

7. The UV-absorbing filter according to claim 1, wherein the outer edge of said UV-absorbing glass plate, outer edges of said first and second distance pieces, and outer edges of said first and second heat-resistant glass plates are kept in alignment with one another.

8. The UV-absorbing filter according to claim 1, wherein said first space is hermetically sealed by said UV-absorbing glass plate, said first heat-resistant glass plate, and said first distance piece; and wherein said second space is hermetically sealed by said UV-absorbing glass plate, said second heat-resistant glass plate, and said second distance piece.

9. An optical apparatus comprising:

a lamp;

a reflector which reflects light emitted from said lamp; and a UV-absorbing filter disposed on an optical path of the light emitted from said lamp and reflected by said reflector;

wherein said UV-absorbing filter includes:

a transparent UV-absorbing glass plate which has a first surface and a second surface and which contains a UV-absorbing substance;

a transparent first heat-resistant glass plate which faces said first surface;

a transparent second heat-resistant glass plate which faces said second surface;

a first distance piece which is made of heat-resistant resin and which is interposed between said first surface and said first heat-resistant glass plate, in the vicinity of an outer edge of said UV-absorbing glass plate, so as to form a first space between said first surface and said first heat-resistant glass plate; and a second distance piece which is made of heat-resistant resin and which is interposed between said second surface and said second heat-resistant glass plate, in the vicinity of an outer edge of said UV-absorbing glass plate, so as to form a second space between said second surface and said second heat-resistant glass plate.

10. The optical apparatus according to claim 9, wherein a reflecting surface of said reflector has the form of a paraboloid of revolution; and wherein said lamp is disposed in such a manner that a center of light emission of said lamp is placed in the vicinity of a focal point of said reflector.

11. The optical apparatus according to claim 10, satisfying $$1.1 < D/d < 2.1$$

where a symbol D denotes an opening diameter of said reflector and a symbol d denotes a diameter of said UV-absorbing filter.

12. The optical apparatus according to claim 9, further comprising:

a condenser lens system which converges the light which has passed said UV-absorbing filter; and a body tube which holds said UV-absorbing filter and said condenser lens system.

13. The optical apparatus according to claim 9, further comprising a condenser lens system which converges the light which has passed said UV-absorbing filter, wherein said optical apparatus satisfies 5.1 fp<fc<9.6 fp, where a symbol fp denotes a focal length of said reflector and a symbol fc denotes a composite focal length of said condenser lens system.

14. The optical apparatus according to claim 12, further comprising:

an optical pillar element;

a light valve;

a light transmitting optical system which provides a substantially conjugate relationship between an end of radiation of said optical pillar element and said light valve, said light transmitting optical system directing the light which is converged by said condenser lens system and passes said optical pillar element onto said light valve; and a projection lens system which projects light which has been modulated by said light valve onto a screen.

* * * * *